ANTHONY R. BARRINGER
*INVENTOR.*
BY Rogers, Bereskin & Parr

INVENTOR.
ANTHONY RENE BARRINGER
BY Rogers, Bereskin & Parr

INVENTOR.
ANTHONY RENE BARRINGER

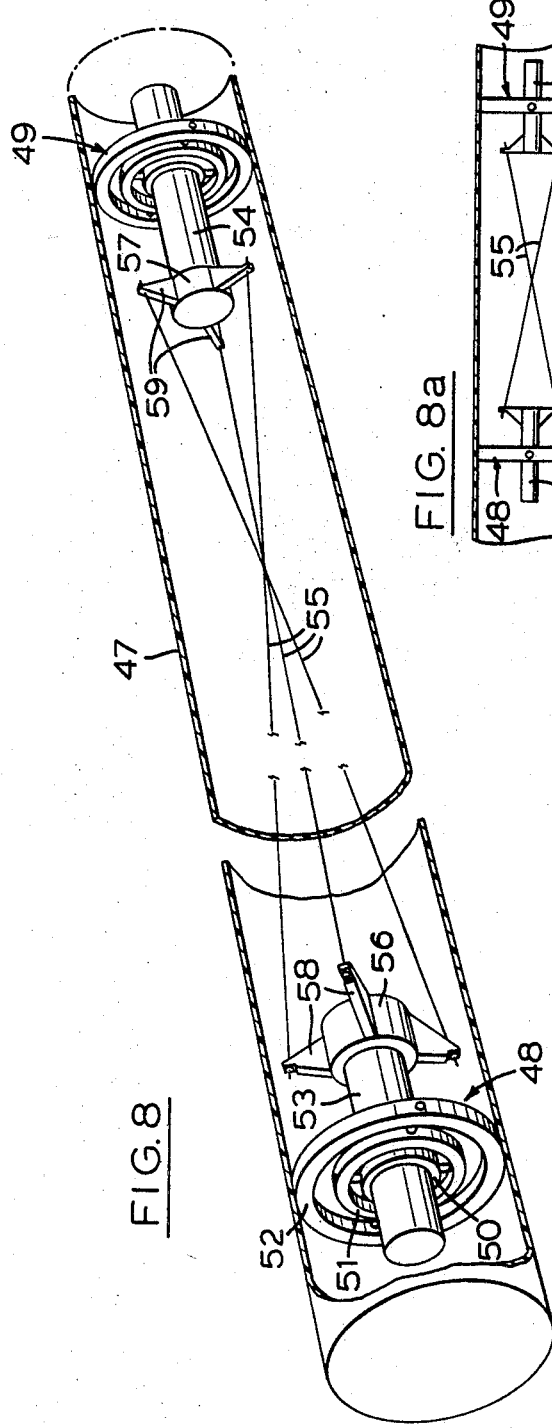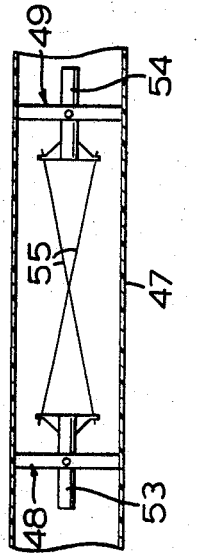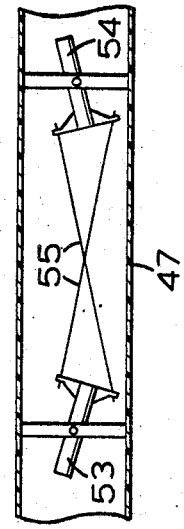

United States Patent Office 3,538,428
Patented Nov. 3, 1970

3,538,428
SUPPORTING SYSTEM FOR MAINTAINING A PAIR OF DEVICES IN A PREDETERMINED ANGULAR RELATIONSHIP WITH ONE ANOTHER
Anthony Rene Barringer, Willowdale, Ontario, Canada, assignor to Barringer Research Limited, Rexdal, Ontario, Canada, a corporation
Filed Aug. 1, 1967, Ser. No. 657,617
Claims priority, application Great Britain, Aug. 2, 1966, 34,668/66
Int. Cl. G01v 3/16
U.S. Cl. 324—4
7 Claims

ABSTRACT OF THE DISCLOSURE

A supporting system especially for maintaining transmitting and receiving coils of an airborne electromagnetic prospecting system in precise null coupling with each other. The transmitting coil is fixed to one end of an elongated supporting tube, and the receiving coil is supported by a gimbal inside the tube at the opposite end. Two pairs of mutually orthogonal taut wires extend diagonally inside the tube from the gimbal to a bracket fixed to the tube near the transmitting coil. By optimizing the spacing of the wires, it has been found that noise voltages induced in the receiving coil due to deformation of the tube can be reduced drastically.

---

Figure 1:
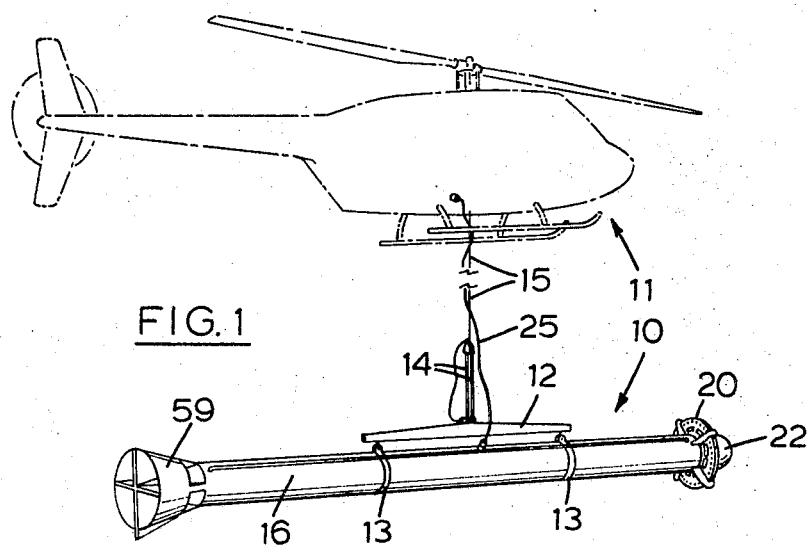

This invention relates to supporting systems for maintaining two or more devices in a highly accurate, spaced apart, predetermined angular relationship with one another, and in particular to an improved supporting system for maintaining transmitting and receiving coils used in airborne electromagnetic prospecting in precise null coupling with one another.

A major problem in airborne electromagnetic prospecting apparatus of the kind employing a continuously energized transmitting coil and a receiving coil spaced from the transmitting coil has been the maintenance of constant coupling between the transmitting coil and the receiving coil. Relative movement of the two coils causes a variation of the coupling between them, and this results in undesirable electrical misorientation noise that limits the sensitivity of the system. Misorientation noise can be eliminated by measuring only those components of the received field that are in "phase quadrature" or 90° out of phase with the transmitted field. A disadvantage of this approach, however, is that considerable information is lost by neglecting the real or in-phase components of the transmitted field. In order to measure such components it was heretofore considered necessary to secure the transmitting and receiving coils to a support that was as rigid as possible. In typical prior systems, the transmitting and receiving coils were secured to the ends of the wings or the fuselage of an aircraft, or in the case of a helicopter, to the ends of a rigid boom towed beneath the helicopter or attached to its underside. Despite careful precautions, however, some flexing of the wings, fuselage or boom is inevitable, and this causes minute changes in the orientation of the coils. While rigidity may be improved by making the supports heavier, weight is a limiting factor particularly in thec ase of light aircraft such as helicopters.

In the present invention, the transmitting and receiving coils are supported by a comparatively light, thin-walled cylindrical tube or other lightweight support. The transmitting coil is fixed to one end of the tube, and the receiving coil is secured to a pivotable support (such as a gimbal) positioned within the tube at the opposite end. At least one and preferably two pairs of taut wires are attached to the gimbal, and they extend diagonally inside the tube with their opposite ends terminating in the vicinity of the transmitting coil. The transmitting and receiving coils are in null coupling. It has been found that if the spacing of the wires at one end compared with the spacing of the wires at the opposite end is adjusted to an optimum value, the transmitting and receiving coils are kept in precise null coupling despite moderate bending of the tube in flight. In effect, the taut wires replace the comparatively heavy supports heretofore used for keeping the transmitting and receiving coils in constant coupling.

The invention is applicable not only to geophysical prospecting systems of the kind described above, but also to supports for flux gate elements of a flux gate magnetometer, supports for mirrors used in optical systems such as multipath optical sample cells and laser systems, and in general systems requiring the precise and stable support of other devices.

Figure 2:
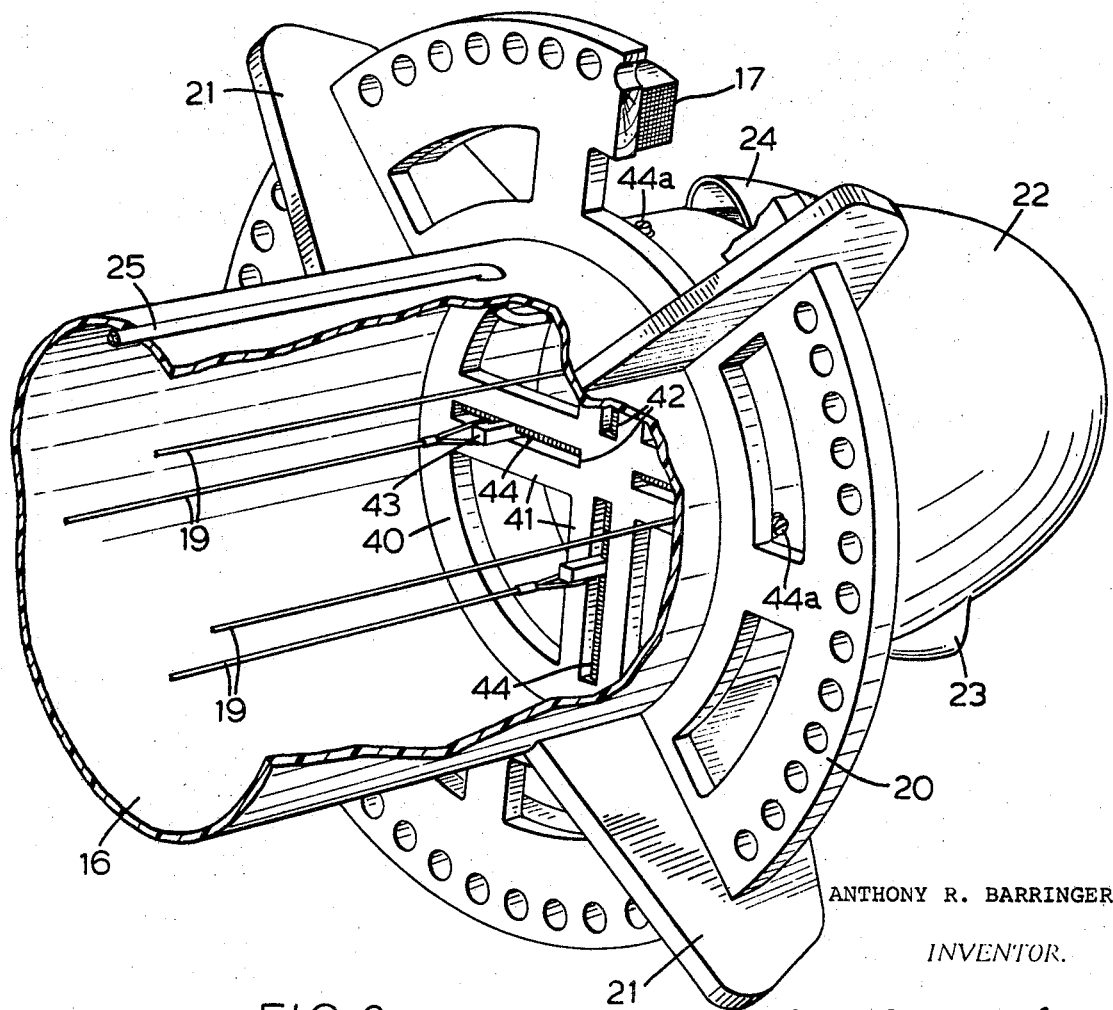
Figure 3:
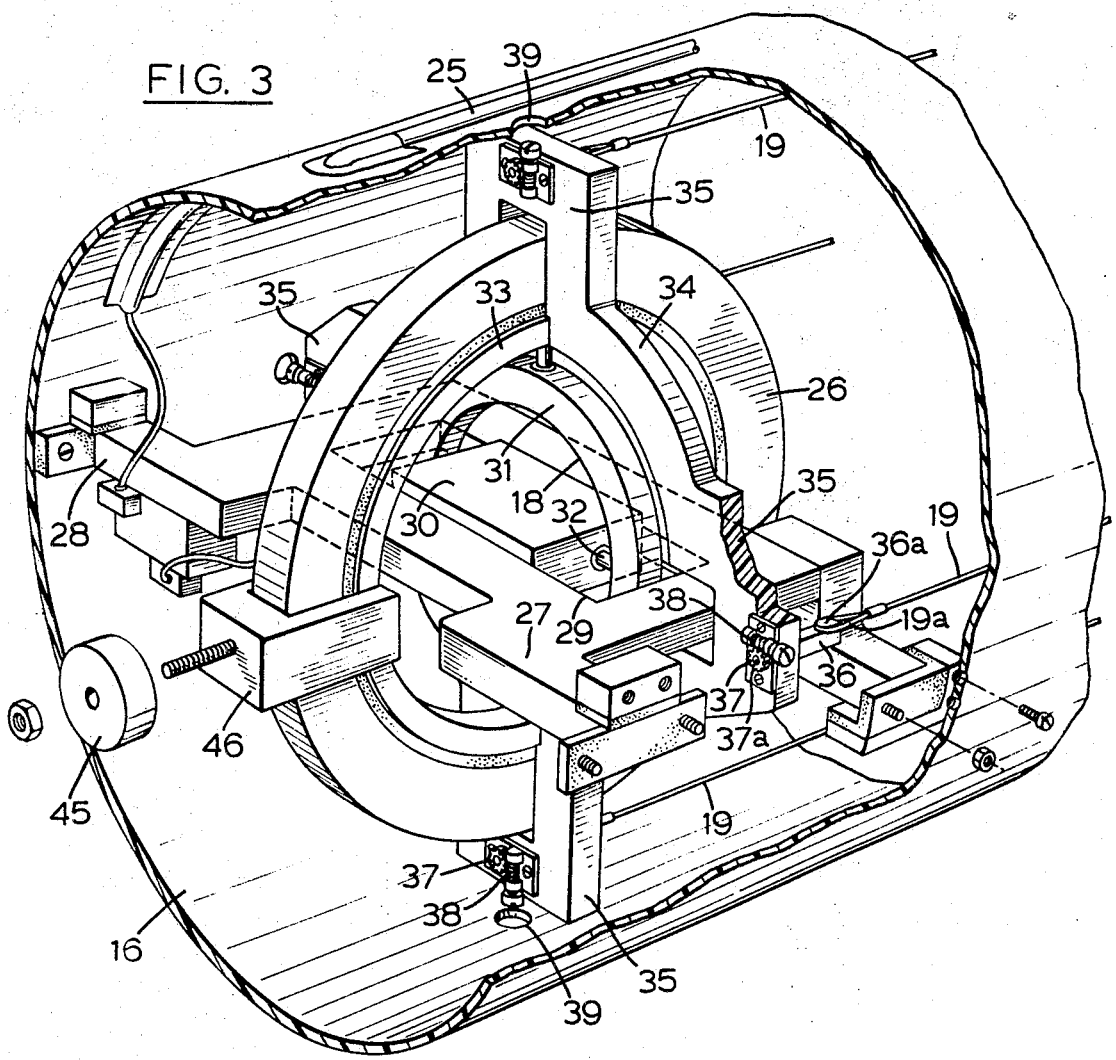
Figure 4:
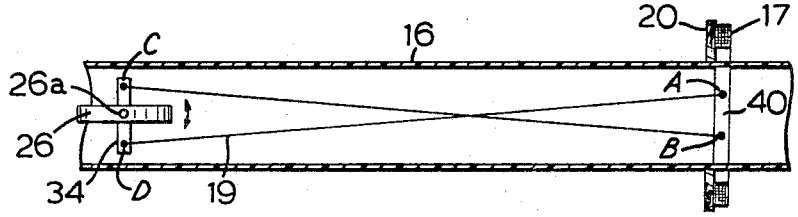
Figure 6:
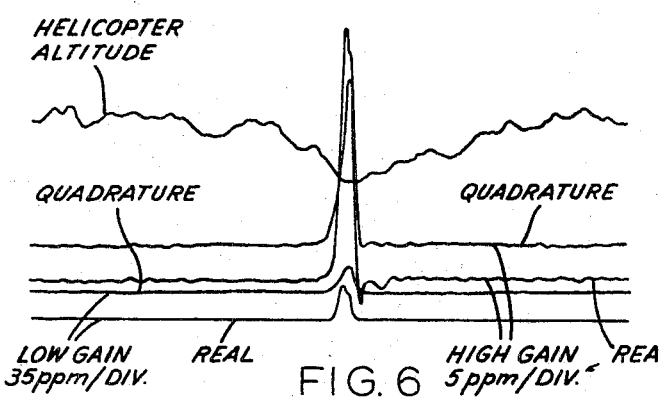
Figure 7:
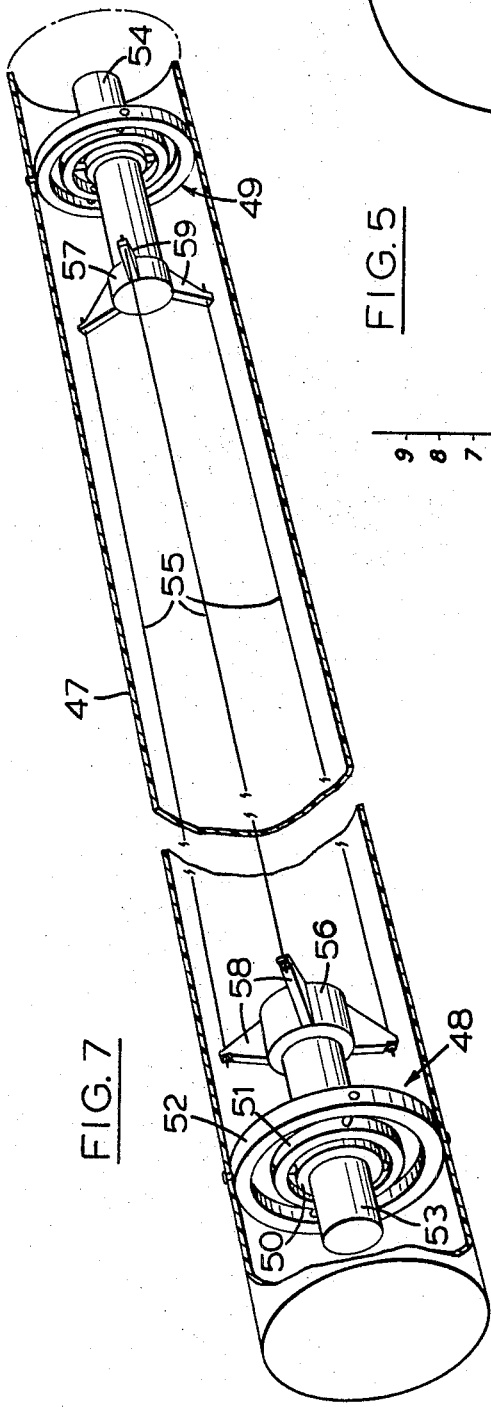
Figure 5:
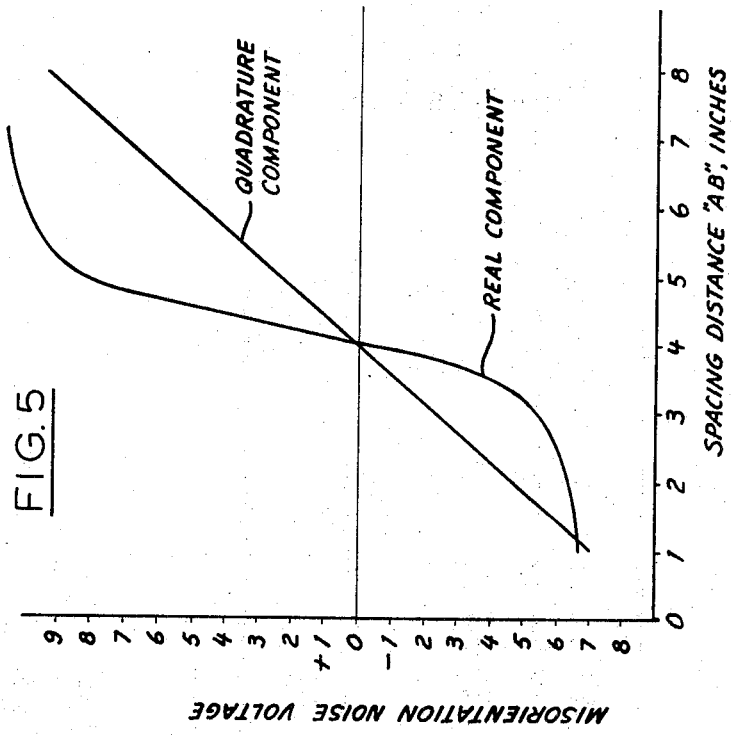
Figure 7A:
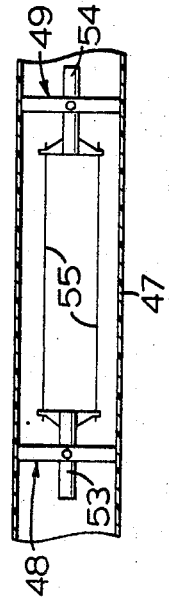
Figure 7B:
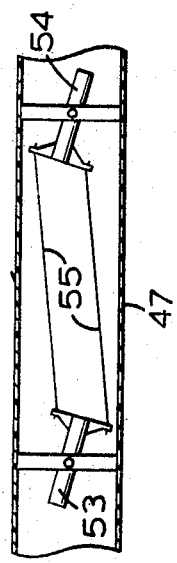

Preferred embodiments of the invention are illustrated in the accompanying drawings, wherein:

FIG. 1 is a perspective view of a preferred form of the invention embodied in a "bird" being towed by a helicopter, FIG. 2 is a perspective view, partly broken away, showing an end of the bird adjacent a transmitting coil, FIG. 3 is a perspective view, partly broken away, showing the opposite end of the third adjacent a receiving coil, FIG. 4, is a diagrammatic sectional view showing the arrangement of wires within the bird, FIG. 5 is a graph showing noise voltage due to deformation of the bird (referred to as misorientation noise voltage), as a function of wire spacing, FIG. 6 is a graph showing measurements made with a prototype of the invention over a known ore deposit, FIG. 7 is a perspective view, partly broken away, of another embodiment of the invention, FIGS. 7a and 7b are diagrammatic views showing the operation of the embodiment of FIG. 7.

FIG. 8 is a perspective view, partly broken away, of a further embodiment of the invention, and FIGS. 8a and 8b are diagrammatic views showing the operation of the embodiment of FIG. 8.

Referring to the drawings and in particular to FIG. 1, a supporting system according to the invention is housed within an elongated hollow supporting structure 10 or "bird" which is towed beneath a helicopter 11 by any suitable means such as a boom 12 fitted with canvas belts 13 encircling the bird 10 and a plurality of heavy elastic shock cords 14 connected to the boom 12 and to a steel cable 15 extending from the helicopter 11. The shell of the bird 10 is constituted by a long, thin-walled rigid tube 16 of fibre glass wood, or other non-conductive rigid material. The forward end of the bird 10 is provided with a bullet-shaped cap 22, and the trailing end is fitted with a drag cone 59 to provide stability in flight. The cable 15 is located at about the center of gravity of the bird 10, the nose of the bird 10 being slightly heavy in flight.

A transmitting coil 17 is fixed rigidly to the outside of the leading end of the tube 16. At the opposite end of the tube 16, an electrostatically shielded receiving coil 26 is supported inside the tube 16 on a gimbal 18. Extending between the gimbal 18 and the transmitting coil 17 is a plurality of taut, diagonally extending wires 19, which are fixed at one end to the gimbal 18 and at the other end to an annular bracket 40 fixed to the inside wall of the tube 16.

The transmitting coil 17 is rigidly attached to the tube 16 by means of an annular bracket 20 and four equiangularly spaced radial struts 21. The bracket 20 and the struts 21 are of plywood or other rigid non-conductive material, and they are glued to the tube 16. Circular openings are formed around the periphery of the bracket 20 to reduce weight. The end of the tube 16 adjacent to the transmitting coil 17 is closed by means of the bullet shaped cap 22. It is convenient to place a transmitter (not shown) for energizing the transmitting coil 17 inside the cap 22 and in order to cool the transmitter an air inlet scoop 23 and an air outlet 24 are formed in the cap 22. The transmitter may be connected with electronic equipment and with batteries or other power sources in the helicopter by means of an electrical cable 25.

The gimbal 18 consists of a central support plate 27 having legs 28 which are attached to the tube 16 by any conventional means. The outer ends of the legs 28 are cushioned by foam rubber pads to isolate mechanically the gimbal 18 from the tube 16 and thereby to reduce the effect of shock and acoustic noise on the receiving coil 26. The support plate 27 has a rectangular cut-out portion 29 within which an inner gimbal bearing block 30 is securely fixed. An inner gimbal ring 31 is pivotally attached to the gimbal block 30 at diametrically opposed points, and is also pivotally attached to an outer gimbal ring 33 upon which the receiving coil 26 is supported. It is preferable to separate the receiving coil 26 from the ring 33 by a layer of foam rubber or silicon rubber to further isolate the receiving coil 26 from shock and acoustical noise. A transverse annular bracket 34 having four radially extending legs 35 is positioned at right angles to the receiving coil 26 with the legs 35 bridging the receiving coil 26, and the bracket 34 is secured to the outer gimbal ring 33. The annular bracket 35 provides anchorage points for the ends of the taut wires 19. The above arrangement permits the receiving coil 26 to move about two mutually orthogonal axes each of which is orthogonal to the longitudinal axis of the tube 16.

The taut wires 19 are connected as follows. Each leg 35 of the bracket 34 is provided with a short rectangular mounting block 36 having a wire attachment means at one end, such as an upturned portion 36a constituting a hook. Each block 36 is slidable longitudinally within a rectangular opening in the corresponding leg 35. Loops 19a are formed in the adjacent ends of the wires 19 and are individually slipped around the hooks 36a. A small pinion 37 is fixed to the outer end of a shaft 37a having a threaded inner end (not shown) and the pinion 37 is adapted to be rotated by a worm gear 38 having a screwdriver adjustment slot in its outer end. The threaded portion of the shaft 37a is threaded into a threaded bore (not shown) of the block 36. Rotation of the worm gear 38 causes the threaded portion of the shaft 37a to rotate, thereby causing the block 36 to move inwardly and outwardly in the direction of the longitudinal axis of the tube 16, depending upon the sense of rotation of the worm gear 38. In this manner the tension of each wire 19 can be varied as desired. Small openings 39 aligned with the worm gears 38 are provided in the wall of the tube 16 to permit tension adjustments to be made from outside the tube 16.

The wires 19 extend diagonally through the tube 16. The wires 19 on opposite sides of the bracket 35 constitute a pair, and it will be noted that each pair of wires 19 lies in a plane that is orthogonal to one of the axes of the gimbal. The wires 19 of each pair cross at a point intermediate the receiving coil 26 and transmitting coil 17, and they are terminated in the vicinity of the transmitting coil 17 in the following manner. An annular bracket 40 is fixed to the inside wall of the tube 16, and is provided with four cross arms 41 each having elongated slots 42. A rectangular wire attachment bracket 43 is slidably positioned within each slot 42, and the position of the bracket 43 is controllable by rotating a threaded rod 44 having a slotted end 44a which protrudes through the wall of the tube 16. Each bracket 43 has a threaded bore in the outer end (i.e. the end nearest the cap 22). The threaded rod 44 extends through each of the threaded bores. The location of each bracket 43 is adjusted by turning the associated slotted end 44a with a screwdriver. Rotation of the rod 44 causes the bracket 43 on the associated rod 44 to move radially inwards or outwards, depending on the sense of rotation of the rod 44. Thus, the spacing of each pair of wires at the transmitting coil end of the tube 16 can be adjusted as desired.

It is important that the gimbal 18 should be balanced accurately both statically and dynamically. A counterweight 45 is attached to a bracket 46 secured to the gimbal 18, to compensate for the force on the gimbal 18 due to tension in the wires 19.

The receiving and transmitting coils are initially aligned so that they are in null coupling with one another. It has been found that the null coupling condition can be maintained to about one second of arc or less despite moderate bending of the tube 16 (e.g. of the order of a minute of arc) by adjusting the ratio of the spacing of the wires 19 to an optimum value, as follows. Referring to FIG. 4, one pair of connecting wires 19 is shown extending between points A, B, C and D. The receiving coil 26 is pivoted about an axis 26a, and it will be noted that the plane of the connecting wires 19 is orthogonal to the axis 26a of the receiving coil 26. In order to determine the optimum spacing, the ends of the tube 16 are supported above the ground and a weight (e.g. about 50 lbs.) is suspended from the tube 16 to cause it to deform. Then, while maintaining the spacing CD constant, the spacing AB is varied and the voltage appearing across the receiving coil 26 is measured. FIG. 5 shows typical curves that are obtained from measurements made in this manner. It is important to note that there is a particular spacing ratio $AB/CD$ at which the real and quadrature misorientation noise voltages attributable to the deflection of the tube 16 are both very nearly zero. By means of this arrangement, the electrical axis of the receiving coil 26 is kept very closely perpendicular to the flux surfaces generated by the transmitting coil 17 despite moderate distortion of the tube 16. The receiving coil 26 does move when the tube 16 is distorted, but the motion is such that the electrical axis of the receiving coil remains perpendicular to the flux surfaces (i.e. in null coupling with the transmitting coil). The optimum ratio of the distances $AB/CD$ is most easily determined experimentally since the exact geometry of the flux surfaces is difficult to measure. In a prototype which has been flown successfully it was found that the best results were obtained when the spacing of the wires at the receiving coil end was twice the spacing of the wires at the transmitting coil and (i.e. the ratio $AB/CD = 1:2$).

It has been found that the spacing and location of the supporting points for the tube 16 has a bearing on the misorientation noise induced in the receiving coil 26. Accordingly, before optimizing the spacing of the wires 19, the spacing and location of the canvas belts 13 (which are used to secure the tube 16 to the boom 12) are adjusted with the tube 16 under a distributed load so as to minimize the misorientation noise output of the receiving coil 26.

In FIG. 4, only two connecting wires are shown, and the receiving coil 26 is shown as having only one direction of movement, namely about the pivot axis 26a. This simple arrangement provides most of the required compensation for distortions of the tube 16 which otherwise would cause deviations from the null coupling relationship between the transmitting and receiving coils. However, it has been found that markedly improved results are achieved when an additional set of connecting wires 19 is provided at right angles to the former set, and the receiving coil 26 is mounted on a gimbal or other supporting means which permits it to pivot about an additional axis which is orthogonal to the axis 26a, both axes being orthogonal to the axis of the tube 16. The plane of the second pair of wires is orthogonal to said additional axis. The improved results obtained with the additional pair of wires apparently is due to the fact that the electrical axis of the receiving coil is not in general exactly coaxial with the mechanical axis of the receiving coil, so that it is necessary to permit the receiving coil 26 to pivot about both of the gimbal axes to maintain null coupling between the transmitting and receiving coils.

In order to achieve optimum results, the supporting system should be designed so that the wires 19 have the highest tension, lowest mass and highest natural resonant frequency. The supporting system works best at highest tensions, but of course there are limits to the tensions that can be employed due to the strength of the wires and the size of the gimbal bearings. The tension of the wires 19 in a prototype of the invention was 60 lbs. This was found to be satisfactory, although it is proposed to use even higher tensions in the future. At the same time, the frequency of wire resonance should be kept high, for example above about 15 cycles per second, and the mass of the wire should be kept low. The tensions in all the wires 19 should be equal. A preferred material for the connecting wires 19 is cold drawn heat treated invar wire of 0.035 inch diameter. The mass of the receiving coil 26 and the mass of the moving parts of the gimbal should be kept low.

While the tube 16 should be as rigid as possible, it will be understood that with the present invention tubes or other supports that otherwise would be completely unsatisfactory can be used to great advantage. A preferred tube 16 was constructed of fibre glass of 5/32" wall thickness, 12" inside diameter and 30' length. A tube constructed in this manner weighs only about 182 pounds.

Although the description above has referred to a transmitting coil having its axis coaxial with the axis of the tube 16 and a receiving coil having an axis orthogonal to the transmitting coil axis and to the longitudinal axis of the tube 16, it will be understood that other null coupling configurations of the transmitting and receiving coils can be employed, as desired. Furthermore, an additional receiving coil can be supported on the gimbal 18. In this case, both receiving coils would have axes orthogonal to the axis of the transmitting coil, and the axes of the receiving coils would be mutually orthogonal as well.

FIG. 6 shows an electromagnetic profile recording made over an ore body known as the "Whistle" deposit, near Sudbury, Ontario, Canada using a prototype of the apparatus described above. The graph indicates the remarkable low noise characteristics of the present supporting system.

The embodiments of FIGS. 7 and 8 employ two gimbals instead of just one. Before the above described supporting system was developed, a two-gimbal system was constructed. A transmitting coil was carried by one gimbal and a receiving coil was carried by the other. This arrangement was found to be less satisfactory for airborne use than the above described single gimbal system, as the former was less rugged and more difficult to adjust. However, the two-gimbal system appears to have considerable merit for laboratory use and other applications where the forces acting on the system are not as severe as they are in an airborne application. Preferred examples of two-gimbal systems are shown in FIGS. 7 and 8.

The supporting system of FIG. 7 includes an elongated hollow tube 47, a first gimbal 48 adjacent to one end of the tube 47, and a second gimbal 49 adjacent to the opposite end of the tube 47. Each gimbal 48, 49 provides freedom of motion about two mutually orthogonal axes each of which is orthogonal to the longitudinal axis of the tube 47. The gimbal 48 includes three concentric rings, namely an inner ring 50 that is pivotally secured to an intermediate ring 51 and an outer ring 52 which pivotally supports the intermediate ring 51. The respective pivot points or bearings of the gimbal rings 50 and 51 are mutually orthogonal, and a tube 53 extends through the inner ring 50 and is fixed thereto. One of the devices to be supported is secured to the tube 53. The gimbal 49 is identical to the gimbal 48 and it is also provided with a tube 54 identical to the tube 53. The other device to be supported is secured to the tube 54.

Brackets 56, 57 are respectively fixed to the inner ends of the tubes 53, 54. Each bracket 56, 57 is formed with a central cylinder socket for receiving the end of the associated tube 53, 54, and each bracket 56, 57 is respectively provided with a set of three equiangularly spaced radial arms 58, 59. At the ends of the bracket arms 58, 59 suitable fasteners are provided for attaching the ends of taut wires 55 to the arms, and the fasteners on one of the brackets are adjustable to permit the tension in each wire to be varied individually. The arms 58, 59 of both brackets 56, 57 are aligned with one another, and three taut wires 55 are respectively strung between aligned bracket arms 58, 59 so that all three wires 55 are mutually parallel. This arrangement can be used where a small displacement of the supported devices is permissible provided that the axes of the devices remain parallel. FIGS. 7a and 7b show the effect of moving either one of the tubes 53, 54 from its normal position; the other tube "tracks" with the former one so as to maintain parallelism of the respective axes of the tubes 53, 54. Only two wires are necessary to give parallel motion, but a third wire is preferred as it adds stability to the system. This supporting system could be used, for example, for supporting the flux gate elements of a flux gate magnetometer, and mirrors used in multipath optical sample cells, and other optical devices.

The embodiment of FIG. 8 is identical to the embodiment of FIG. 7 except that the wires 55 are strung diagonally and the brackets 56, 57 are aligned so that each bracket arm 58 is diametrically opposite a corresponding bracket arm 59 on the opposite bracket. This arrangement provides inverse tracking of the tubes 53, 54, as shown in FIGS. 8a and 8b.

What I claim as my invention:

1. A supporting system for maintaining a transmitting coil and a receiving coil of a geophysical prospecting system in a highly accurate, spaced apart, predetermined angular relationship with one another, comprising:

rigid elongated supporting structure means having a longitudinal axis, said transmitting coil being fixed to said structure means, a gimbal having freedom of motion about two mutually orthogonal axes each of which is orthogonal to the said longitudinal axis of the structure means, said gimbal being spaced longitudinally from said transmitting coil and said gimbal being adapted to support said receiving coil in null coupling with said transmitting coil, and two pairs of taut wires extending diagonally between said transmitting and receiving coils, the wires of said pairs being secured to said structure means near said transmitting coil and being secured to said gimbal at their opposite ends, the wires of said pairs respectively being positioned in planes which are orthogonal to said orthogonal axes of said gimbal.

2. A supporting system as claimed in claim 1 wherein the ratio of the spacing of said wires at their ends adjacent the transmitting coil relative to the spacing at their ends which are secured to said gimbal is 1:2.

3. A supporting system as claimed in claim 2 wherein said structure means is an elongated thin hollow tube.

4. A supporting system as claimed in claim 2 wherein said gimbal is balanced both statically and dynamically, the tension is said wires is at least about 60 lbs., and said gimbal is counterbalanced to compensate for the tension in said wires.

5. A supporting system as claimed in claim 2 wherein the tension in each of the wires is manually adjustable.

6. A supporting system as claimed in claim 2 wherein the spacing of the wires at one end is adjustable.

7. A supporting system as claimed in claim 6 wherein the gimbal is supported on rubber pads and the receiving coil is separated from the gimbal by a layer of rubber to reduce the effect of mechanical shock and acoustical noise on the receiving coil.

References Cited

Felch et al., Airborne Magnetometers Electrical Engineering, July 1947, pp. 680–685.

Wyckoff, R. D., The Gulf Airborne Magnetometer, Geophysics, August 1948, pp. 194–200 only.

GERARD R. STRECKER, Primary Examiner

U.S. Cl. X.R.

248—276, 278; 324—6; 350—16